United States Patent
Singh et al.

(10) Patent No.: US 7,933,868 B2
(45) Date of Patent: Apr. 26, 2011

(54) METHOD AND SYSTEM FOR PARTITION LEVEL CLEANUP OF REPLICATION CONFLICT METADATA

(75) Inventors: Ram Pratap Singh, Sammamish, WA (US); Philip Austin Vaughn, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 450 days.

(21) Appl. No.: 10/981,360

(22) Filed: Nov. 4, 2004

(65) Prior Publication Data

US 2006/0095481 A1    May 4, 2006

(51) Int. Cl.
G06F 17/30 (2006.01)
(52) U.S. Cl. ......... 707/625; 707/612; 707/616; 707/619
(58) Field of Classification Search .................... 707/204
See application file for complete search history.

(56) References Cited

U.S. PATENT DOCUMENTS

| | | | |
|---|---|---|---|
| 4,432,057 A | 2/1984 | Daniell et al. | |
| 4,769,772 A | 9/1988 | Dwyer | |
| 4,853,843 A | 8/1989 | Ecklund | |
| 4,887,204 A | 12/1989 | Johnson et al. | |
| 5,291,594 A | 3/1994 | Sekiguchi et al. | |
| 5,440,686 A | 8/1995 | Dahman et al. | |
| 5,737,601 A | 4/1998 | Jain et al. | |
| 5,745,837 A | 4/1998 | Fuhrmann | |
| 5,758,355 A * | 5/1998 | Buchanan | 707/201 |
| 5,784,635 A | 7/1998 | McCallum | |
| 5,794,242 A * | 8/1998 | Green et al. | 707/10 |
| 5,999,947 A * | 12/1999 | Zollinger et al. | 707/203 |
| 6,044,374 A * | 3/2000 | Nesamoney et al. | 707/10 |
| 6,047,289 A | 4/2000 | Thorne et al. | |
| 6,094,715 A | 7/2000 | Wilkinson et al. | |
| 6,134,561 A | 10/2000 | Brandien et al. | |
| 6,199,100 B1 | 3/2001 | Filepp et al. | |
| 6,272,491 B1 * | 8/2001 | Chan et al. | 707/8 |
| 6,321,236 B1 | 11/2001 | Zollinger et al. | |
| 6,415,286 B1 | 7/2002 | Passera et al. | |

(Continued)

FOREIGN PATENT DOCUMENTS

WO    WO 03/038681 A1    5/2003

OTHER PUBLICATIONS

Carey, M.J. et al., "Conflict Detection Tradeoffs for Replicated Data", *ACM Transactions on Database Systems*, Dec. 1991, 16(4), 703-746.

(Continued)

*Primary Examiner* — Neveen Abel Jalil
*Assistant Examiner* — Farhan M Syed
(74) *Attorney, Agent, or Firm* — Woodcock Washburn LLP

(57) ABSTRACT

A method of removing metadata from a database in a multi-mode replication system includes establishing a metadata retention period for nodes in the system as well as associating changes with nodes on the system. The system responds to an expiration of the retention period for any one node by analyzing the associated changes and nodes and determining if the change affects data shared with other nodes. If the data is shared with other nodes then the expired retention period node metadata is removed from the system. If the expired metadata retention period node does not share the changes with other nodes, the metadata is not removed. This allows any unique changes to still be entered into the database without adversely affecting other nodes.

5 Claims, 5 Drawing Sheets

U.S. PATENT DOCUMENTS

| | | | |
|---|---|---|---|
| 6,446,092 B1 * | 9/2002 | Sutter | 707/203 |
| 6,466,950 B1 | 10/2002 | Ono | |
| 6,470,345 B1 * | 10/2002 | Doutre et al. | 707/100 |
| 6,493,720 B1 * | 12/2002 | Chu et al. | 707/104.1 |
| 6,779,093 B1 * | 8/2004 | Gupta | 711/162 |
| 6,985,901 B1 * | 1/2006 | Sachse et al. | 707/10 |
| 7,072,894 B2 | 7/2006 | Loy et al. | |
| 7,127,460 B2 * | 10/2006 | Nixon et al. | 707/10 |
| 7,139,772 B2 * | 11/2006 | Bamford et al. | 707/102 |
| 7,200,668 B2 | 4/2007 | Mak et al. | |
| 7,406,499 B2 | 7/2008 | Singh et al. | |
| 2002/0087552 A1 * | 7/2002 | Applewhite et al. | 707/10 |
| 2002/0174103 A1 | 11/2002 | Hsiao et al. | |
| 2003/0004952 A1 * | 1/2003 | Nixon et al. | 707/10 |
| 2003/0191752 A1 | 10/2003 | Fairweather | |
| 2004/0030703 A1 * | 2/2004 | Bourbonnais et al. | 707/100 |
| 2004/0054763 A1 | 3/2004 | Teh et al. | |
| 2004/0199550 A1 | 10/2004 | Ito et al. | |
| 2004/0215640 A1 * | 10/2004 | Bamford et al. | 707/100 |
| 2005/0120025 A1 * | 6/2005 | Rodriguez et al. | 707/10 |
| 2005/0125411 A1 * | 6/2005 | Kilian et al. | 707/10 |
| 2005/0262166 A1 * | 11/2005 | Rajeev et al. | 707/204 |
| 2006/0004689 A1 * | 1/2006 | Chandrasekaran et al. | 707/1 |
| 2006/0200533 A1 * | 9/2006 | Holenstein et al. | 709/208 |

OTHER PUBLICATIONS

Cho, J. et al., "Synchronizing a Database to Improve Freshness", *International Conference on Management of Data, Proceedings of the 2000 ACM Sigmod International Conference on Management of Data*, 2000, 117-128.

Rahm, E., "Empirical Performance Evaluation of Concurrency and Coherency Control Protocols for Database Sharing Systems", *ACM Transactions on Database Systems*, Jun. 1993, 18(2), 333-377.

Terry, D.B. et al., "Managing Update Conflicts in Bayou, a Weakly Connected Replicated Storage System", *ACM Symposium on Operating Systems Principles, Proceedings of the Fifteenth ACM Symposium on Operating Systems Principles*, 1995, 172-182.

Yee, W.G. et al., "A Framework for Designing Update Objects to Improve Server Scalability in Intermittently Synchronized Databases", *Conference on Information and Knowledge Management, Proceedings of the Ninth International Conference on Information and Knowledge Management*, 2000, 54-61.

D., "Parallelism and the Bird-Meertens Formalism", Apr. 24, 1992, 1-16.

European Application No. 04008233: European Search Report dated Jul. 4, 2007, 1 page.

Eraslan et al., "A Scalable Network Architecture for Distributed Virtual Environments with Dynamic QoS over IPv6", Kemer-Antalya, Turkey, Eighth IEEE Symposium on Computers and Communications, Jun. 30—Jul. 3, 2003, 1-16.

* cited by examiner

_US 7,933,868 B2_

METHOD AND SYSTEM FOR PARTITION LEVEL CLEANUP OF REPLICATION CONFLICT METADATA

CROSS REFERENCE TO RELATED PATENT APPLICATIONS

The following references have subject matter in common with the current application:

Co-Pending patent application Ser. No. 10/434,647 filed May 9, 2003 entitled "Architecture for Partitioned Computers and Propagation of Changes in Data Replication" commonly assigned with the present application.

Co-Pending patent application Ser. No. 10/977,652 filed Oct. 29, 2004 entitled "Method and System for Performing Subset Computation for Replication Topologies" commonly assigned with the present application.

FIELD OF THE INVENTION

This invention relates in general to the field of database management. More particularly, this invention relates to the management of metadata in database replication systems.

BACKGROUND OF THE INVENTION

A distributed database is a relational database whose information may be replicated out to multiple user databases. Although dispersed, a distributed database system manages and controls the entire database as a single collection of data. Distributed databases often get updates from multiple users while in operation. In normal operation, a distributed database is accessed by a user and a portion of the information is changed. The changes can be saved back to the database and then distributed out to some or all of multiple other users for their reference. This is done because changes made by one user can affect another user if the data that one user is manipulating is the same data that another user is relying on. Often, the multiple users access the same data at different times and can manipulate that data in different ways before returning it to the database to be saved. Conflicts can arise in a distributed database system as a result of moving a data set or image to and from a users database. For example, a conflict can arise due to multiple updates on the same data set image from multiple users. The distributed database management system must resolve the multiple user changes in order to keep a properly updated and consistent database core. Conflicts arising from multiple users changing the same data can be resolved in the central database of the replication system. Conflict resolution rules can be established based on many factors including but not limited to the type of database, its application, and the hierarchical status of the one user over another.

Data changes and the statistics of the changes, such as who made the changes and when, are stored in metadata with the data of record in the database. In large databases with a large number of users, the conflict metadata can become so large that system stability, scalability, and performance are adversely affected. Large amounts of saved metadata also require large amounts of storage which can be difficult to accommodate if metadata continues to grow. One prior art method of dealing with the growth and convergence difficulties of accumulating a vast quantity of metadata is to set time deadlines for change updates. For example, in a large system with hundreds of users, metadata may be stored for a week so that, among other tasks, conflict resolution may occur. In this instance, it may be necessary to save metadata change history for a week so that a full conflict resolution concerning all changes can be accommodated.

In the current example, at the end of the one week period, the metadata has grown to a point where the storage capacity or the performance of the database may be at a constraint to system performance. Change metadata needed for conflict resolution is then removed. By removing the change metadata, the database system may avoid problems associated with excess metadata such as lack of convergence, stability, storage or performance. However, changes not submitted before the change metadata removal are unable to be accommodated. The user submitting the changes must download a new set of data from the database and start from that point without his earlier changes being entered.

This metadata management technique, although commonly used, can force many users who did not get their changes in before the cutoff time to loose their changes and start over by downloading new information. Also, this may be inequitable to the user who is manipulating a piece of data that no other user is accessing. In a scheme where multiple users can access overlapping portions of data, changes submitted to and resolved by the database are transmitted to other users who have requested the same data so that all users may utilize the most current version of the data they are viewing. Users who have not actively requested the same portion of data do not get updates on data that they are not using. This scenario, coupled with the cutoff deadline for changes discussed above, sets up the inequitable requirement that a sole user of a specific portion of data who does not submit his changes before the cutoff deadline loses his ability to incorporate those changes even though no other user is viewing or manipulating his specific portion of the database. However, this is a heretofore necessary, but adverse, consequence of the use of a cutoff deadline rule for the management of change metadata.

Thus, there is a need for a distributed database management method and system which manages change metadata such that data changes not submitted by a change deadline are not universally lost by all users incorporating a change deadline management scheme. The present invention addresses the aforementioned needs and solves them with additional advantages as expressed herein.

SUMMARY OF THE INVENTION

Aspects of the invention includes a method to clean up metadata at a sub database or partition level. By grouping database changes into partitions, a replication system is able to determine which rows go to which subscribers and cleanup metadata at a workgroup level. Subscribers may also be known as users or nodes at a workgroup level that are members of the replication topology in which data is sent to subscribers where it is updated and sent back to the originating database. In one embodiment, the working group level is a node which gets a replica of a portion of database data. A metadata retention timer is set for each node and the metadata is purged if the node associated with the expired timer would have had its data shared with other nodes. Alternately, the metadata is not purged if the node operated on a portion of database data that only the expired node operates upon. Thus, any changes locally stored in the node but not synchronized with the database can be saved and not lost after the retention timer expires. This ability to submit changes after the retention period for node-isolated sets of data changes is enabled by the use of an association of changes to nodes and allows a more flexible method for metadata accumulation management.

BRIEF DESCRIPTION OF THE DRAWINGS

The foregoing summary, as well as the following detailed description of exemplary embodiments, is better understood when read in conjunction with the appended drawings. For the purpose of illustrating embodiments of the invention, there is shown in the drawings exemplary constructions of the invention; however, the invention is not limited to the specific methods and instrumentalities disclosed. In the drawings.

DETAILED DESCRIPTION OF ILLUSTRATIVE EMBODIMENTS

Exemplary Embodiments of the Invention

Figure 1:
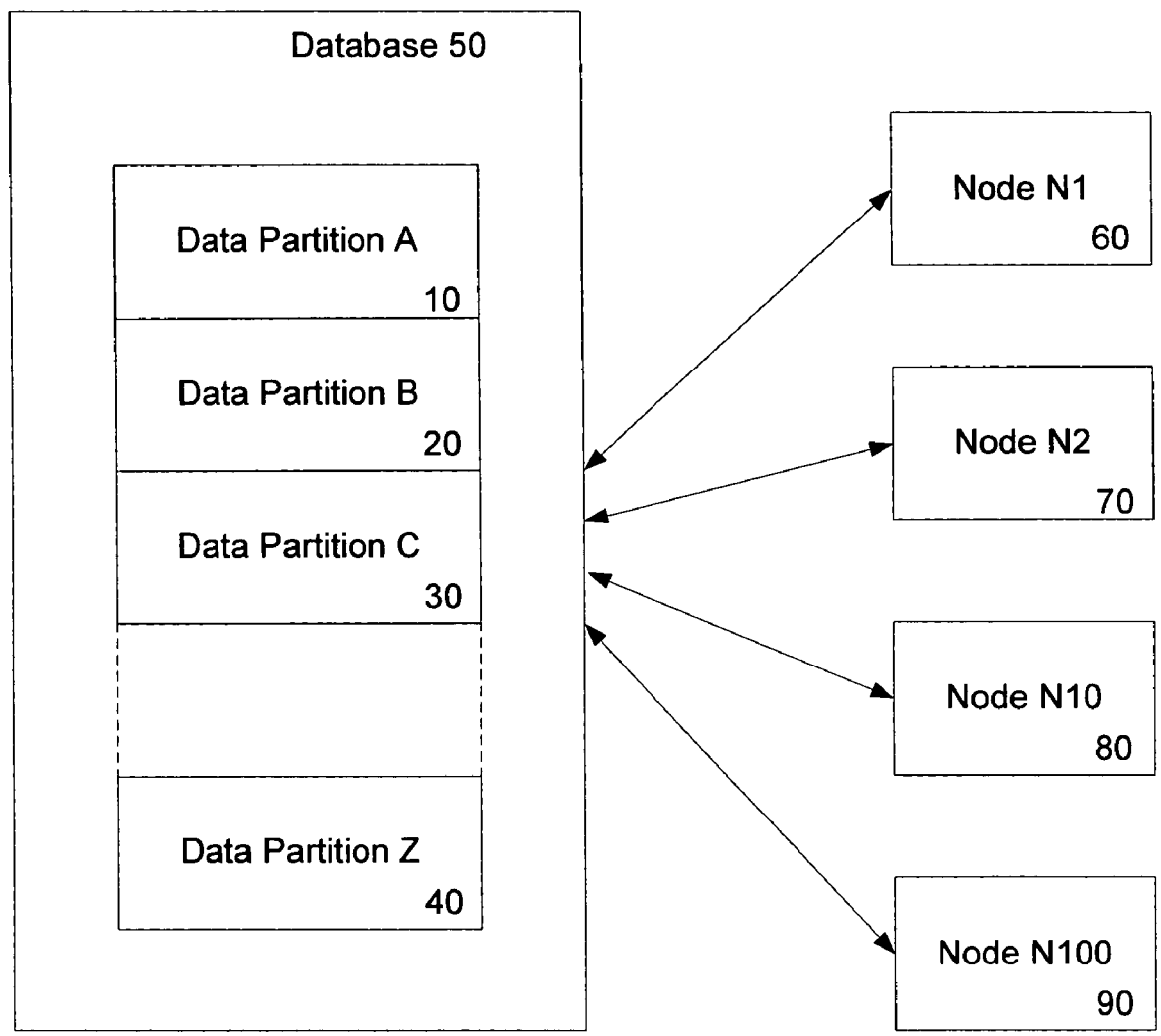
FIG. 1 is a block diagram of a prior art system which may host aspects of the invention.

FIG. 1 is a depiction of a prior art replication system 100, that includes a database 50 and multiple nodes 60, 70, 80, and 90. In this system the database 50 may be subsetted into multiple partitions 10, 20, 30, 40. Each partition may be replicated by the system 100 and sent to any node that requests it. For example, Node N1 (60) may request partition A 10 along with partition Z 40. Node N2 (70) may request only partition B 20. Node N10 (80) may request partition C 30. Node N100 (90) may request partition A 10 and partition C 30.

Table 1 indicates a mapping of data partitions to nodes and indicates that nodes N1, N10, and N100 are using data partition A. Any change to an element of data partition A that is made by node A would be of interest to nodes N10 and N100 because those nodes are also subscribing to the information in data partition A. Consequently, any change made to partition A is properly propagated to the other nodes such that nodes N1, N10, and N100 receive the updated information.

TABLE 1

| Node to Dataset Mapping | |
|---|---|
| Node | Data Partition |
| Node 1 | Partition A, Partition Z |
| Node 2 | Partition B |
| Node 10 | Partition A, Partition C |
| Node 100 | Partition A, Partition C |

The action of an editing node submitting a change to partition data so that other nodes may benefit from the change may be termed synchronization. During a synchronization, a node that has a partition data change submits the change back to the database 50 where conflicts may be resolved between the database and other nodes. Once the conflicts are resolved and a change to a partition element is made, the change is propagated to other interested nodes. The resolution of conflicts involves the use of metadata concerning the partition data and the change which includes such information as which node made the change, the time of the change, the type of change and the other nodes that may be affected by the change. This metadata may also contain version vectors which store replica and version information or simply before and after values of the data. Metadata such as this can become large and prior art systems have developed a scheme for keeping the size of metadata to within manageable and reasonable limits.

One such scheme to regulate the accumulation of metadata is to delete change metadata in a node after a specific period of time. This restriction avoids the buildup of metadata but is also a technique that forces nodes to submit their changes before the metadata retention period expires. If a node does not submit its changes before the metadata retention period expires, then the node looses any changes it made and locally stored, but has not submitted to the database. The loss of the locally stored change is forced because the expired time change cannot be properly checked for conflicts due to the removal of change metadata after the retention period. Changes submitted after the retention period by a node are lost. Additionally, any node that fails to synchronize runs the risk of having stale data. Therefore an expired node generally has to re-download fresh data of interest from the database after the retention period expires.

Figure 2:
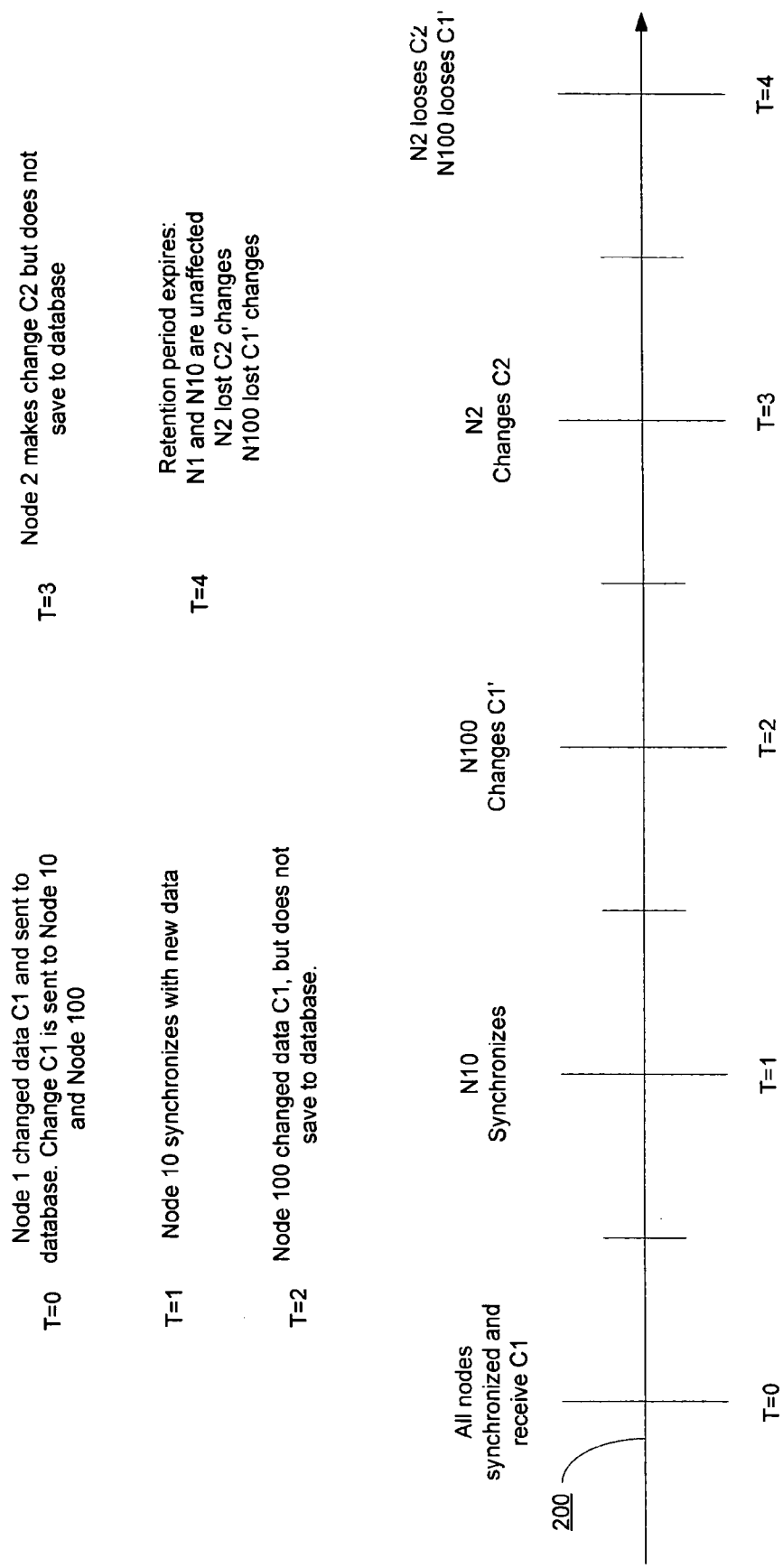
FIG. 2 is an activity timeline of a prior art system.

FIG. 2 represents an activity timeline 200 of a prior art multi-node replication system architected similarly to FIG. 1. In FIG. 2, the timeline is divided into four segments where, in this example, the segments arbitrarily represent days. The system is fashioned such that the metadata retention period is set to be four days. In this exemplary activity timeline 200, the nodes and data partitions are the same as those shown in FIG. 1 and Table 1.

At the beginning of the first day, at T=0, all nodes, are synchronized such that their retention period are reset and each node has fresh data. It is also assumed that at T=0, node N1 changed one of its partition A data elements resulting in change C1. This change was propagated to nodes N10 and N100 who also subscribe to partition A data. At time T=1, node N10 synchronizes with the database and acquires fresh data. As a consequence, the node N10 retention period is reset while the retention periods of the non-resynchronized nodes, N1, N2 and N100 continue to accumulate time.

At time T=2, node N100 changes the new value of the element in data partition A and forms C1' from the previous C1. However, node N100 only stores the value locally and does not synchronize the change. The other nodes are unaware of the change to C1'. A similar event occurs at time T=3 where node N2 makes a change to data partition B. The node N2 change makes a change referred to as C2 in data partition B. However, node N2 stores the data locally and does not synchronize the change with the database.

At time T=4, the retention period for nodes N1, N2 and N100 expires. As a consequence, the change metadata for these nodes is purged and is not available for purposes such as change conflict resolution. Node N1 has made no changes to any data and is therefore unaffected by the expiration of its retention period. Node N2 looses change C2 in data partition B as a result of the expiration of its retention period. This is true even though no other node in the system is also using data partition B. Node N2 is now unable to submit its change C2. To make a change, Node N2 must download fresh information and re-perform the change C2 and then submit that change to the database even though no other node is using the data. This result is common in prior art metadata management operations.

Also at time T=4, node N100 looses its change C1'. Here, it is clear that other nodes, notably nodes N1 and N10, use the same data partition A data wherein change C1' resides. Consequently, at the end of the retention period at time T=4, node N100 looses its change metadata and is unable to successfully make its C1' change. If node N100 wants to insert change C1' into the database after T=4, it must download fresh data and re-perform the change that resulted in change C1'.

As a consequence of the prior art rule of a fixed metadata retention period for all nodes, all nodes loose changes that they make and save locally of they do not submit their changes before the retention period expires. This rule can have undesirable consequences for nodes that have important changes but are unable to submit those changes before the retention expiration deadline.

Figure 3:
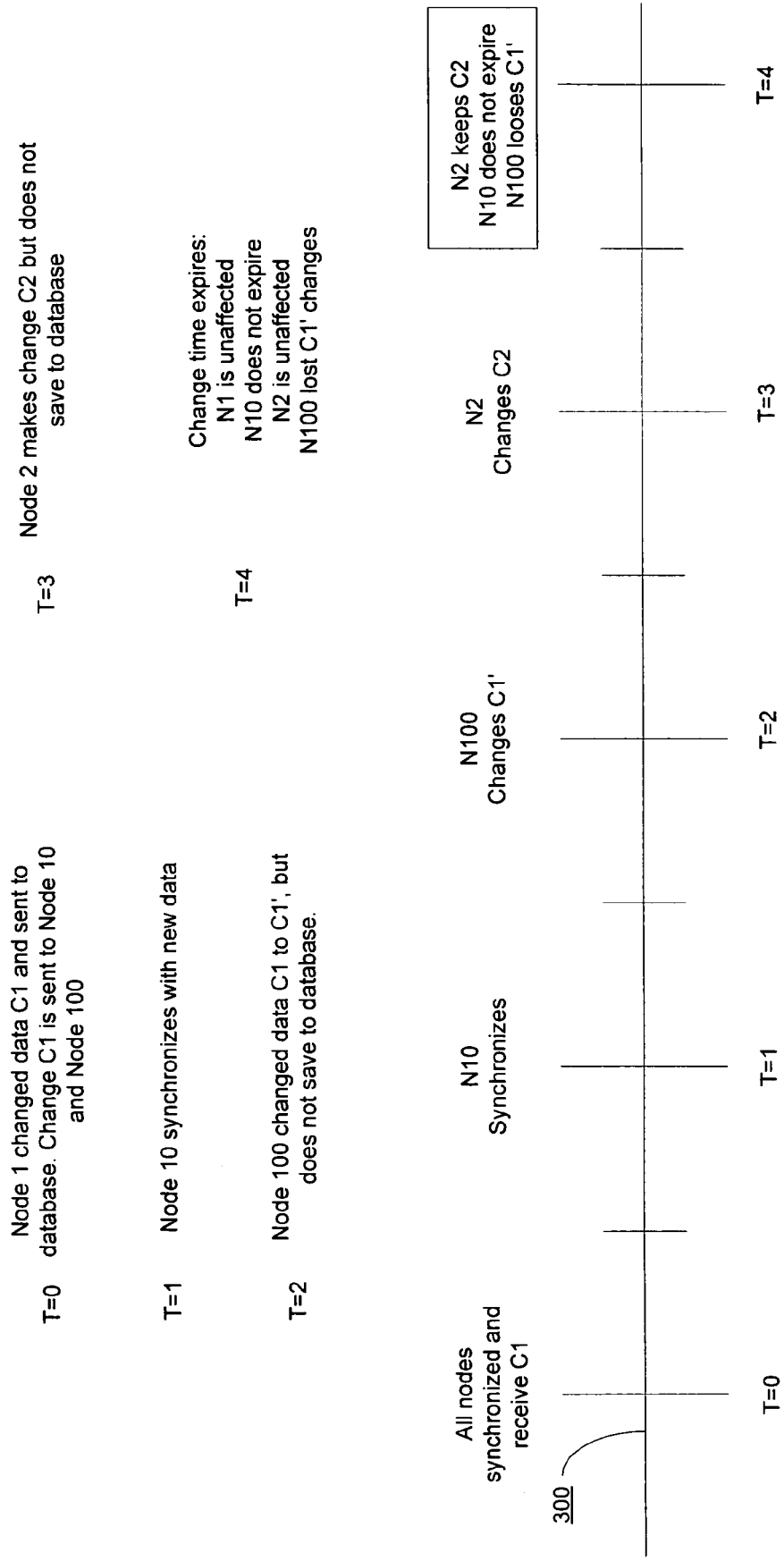
FIG. 3 is an activity timeline showing aspects of the invention.

FIG. 3 is an exemplary activity timeline 300 that incorporates aspects of the invention. The timeline 300 maintains the basic premise of the FIG. 2 timeline 200 wherein four nodes N1, N2, N10 and N100 are present in the system and wherein the Table 1 distribution of data partitions has occurred. The exemplary timeline 300 also assumes a system that incorporates a four day metadata retention period.

At time T=0 in FIG. 3, all nodes in the system are synchronized wherein all nodes have received a change C1 made by node N1. At T=0, the change C1 was propagated to the other interested nodes N10 and N100. Node N2 was also synchronized at this time, but not because it needed to receive the change C1. Node N2 is synchronized at time T=0 in FIG. 3 for reasons other than a propagation of change C1. In this example, the synchronization of node N2 is assumed to be an event independent of the synchronization of the other nodes, but coincidentally simultaneous in time.

As in FIG. 2, at time T=1 in FIG. 3, node N10 synchronizes with the database and acquires fresh data. As a consequence, the node N10 retention period is reset while the retention periods of the non-resynchronized nodes, N1, N2 and N100 continue to accumulate time.

At time T=2, node N100 changes the new value of the element in data partition A and forms C1' from the previous C1. However, node N100 only stores the value locally and does not synchronize the change. The other nodes are unaware of the change to C1'. A similar event occurs at time T=3 where node N2 makes a change to data partition B. The node N2 change makes a change referred to as C2 in data partition B. However, node N2 stores the data locally and does not synchronize the change with the database. These events are similar to the events that occurred at similar times in the timeline 200 of FIG. 2.

Returning to FIG. 3, at time T=4, the retention period for nodes N1, N2 and N100 expires. According to an aspect of the invention, the node N1 is unaffected by the expiration of the metadata because node N1 had no pending changes. According to an aspect of the invention, node N2 does not loose its change data as before in FIG. 2 even though its retention period has expired. This result is a consequence of the recognition that the node N2 change C2 affects no other nodes. That is, there is no other external node in the system that would be entitled to see the C2 change if it were submitted to the database for conflict resolution and subsequent distribution to interested nodes. There are no other interested nodes. Therefore, the metadata persistent in the database that would allow the change C2 from node N2 is retained. Node N2 is not forced to download fresh data and re-perform the change C2. Node C2 can perform the change after the its data retention period has expired as long as no other node requires that same information. This is one advantage of the present invention.

Returning to FIG. 3 at time T=4, node N100 looses its change C1'. Here, it is clear that other nodes, notably nodes N1 and N10 use the same data partition A data wherein change C1' resides. Consequently, at the end of the retention period at time T=4, node N100 looses its change metadata and is unable to successfully make its C1' change. This result is similar to the result of FIG. 2. As before, if node N100 wants to insert change C1' into the database after T=4, it must download fresh data and re-perform the change that resulted in change C1'.

In one aspect of the invention, changes to data elements of a database downloaded to nodes are mapped in a change-to-node association. This change-to-node association allows a database to determine which nodes can retain the metadata and which nodes have metadata that can be purged. Generally, metadata concerning a node is expired and may be purged if that node is one that would have received changes generated by other nodes and the node has a retention period that has expired. When such a node has changes that are submitted after the retention period, the changes are discarded because there is no conflict metadata to resolve the change against other nodes and the database information. Conversely, if there is a node that has made local changes to one or more elements of data that are not shared by any other node, then the conflict metadata for that local changed data node is not automatically purged upon expiration of the retention period for the node. This advantageous result is enabled by the use of the node-to-change association of the present invention.

A node-to-change association list is a list indicating which nodes changes need to be distributed out based on the partitions of the nodes. For instance, if change C1 pertains to data for state='WA' and nodes N1 and N2 have partition of state='WA', then the change-to-node mapping list would contain the following exemplary entries:

---
C1, N1
C1, N2
...
C2, N3 (some other change C2 for another node N3)

---

A separate list of changes records information about each change, which typically includes metadata about the change and the date/time the change was made. For example:
C1, Metadata1, Nov. 1, 2004
C2, Metadata2, Oct. 5, 2004
A third list is maintained to record the last timestamp of change received by all other nodes from the current node. For example,
N1, Nov. 2, 2004
N2, Nov. 2, 2004
N3, Oct. 1, 2004
N4, Sep. 1, 2004
When the procedure to clean up change metadata is executed, change C1 can be cleaned up because all nodes that needed the change have already received it. This can be assumed to be the case because change C1 was made on Nov. 1, 2004 and nodes N1 and N2 have received changes up to Nov. 2, 2004, and they are the only nodes that need change C1. Hence, the metadata for C1 can be cleaned up. Change C2 has not yet been received by node N3 because N3 has received changes up to Oct. 1, 2004 and C2 was made later on Oct. 5, 2004. Yet metadata for change C2 needs to be cleaned up because it is older than the retention period from the current time, and is considered too old and hence expired. Since N3 has not received this change yet, it will now never be able to receive it. The only alternative is to expire N3 and reinitialize N3, i.e. refresh it with fresh data from the current node. Node N4 has received changes only up to Sep. 1, 2004. Changes C1 and C2 got cleaned up because of reasons mentioned above, but node N4 is not expired because the change-to-node mapping list indicates it should not have received either of those changes anyway. One of skill in the art will recognize that the above mapping list entries are exemplary only to demonstrate the principles of the current invention.

Figure 4:
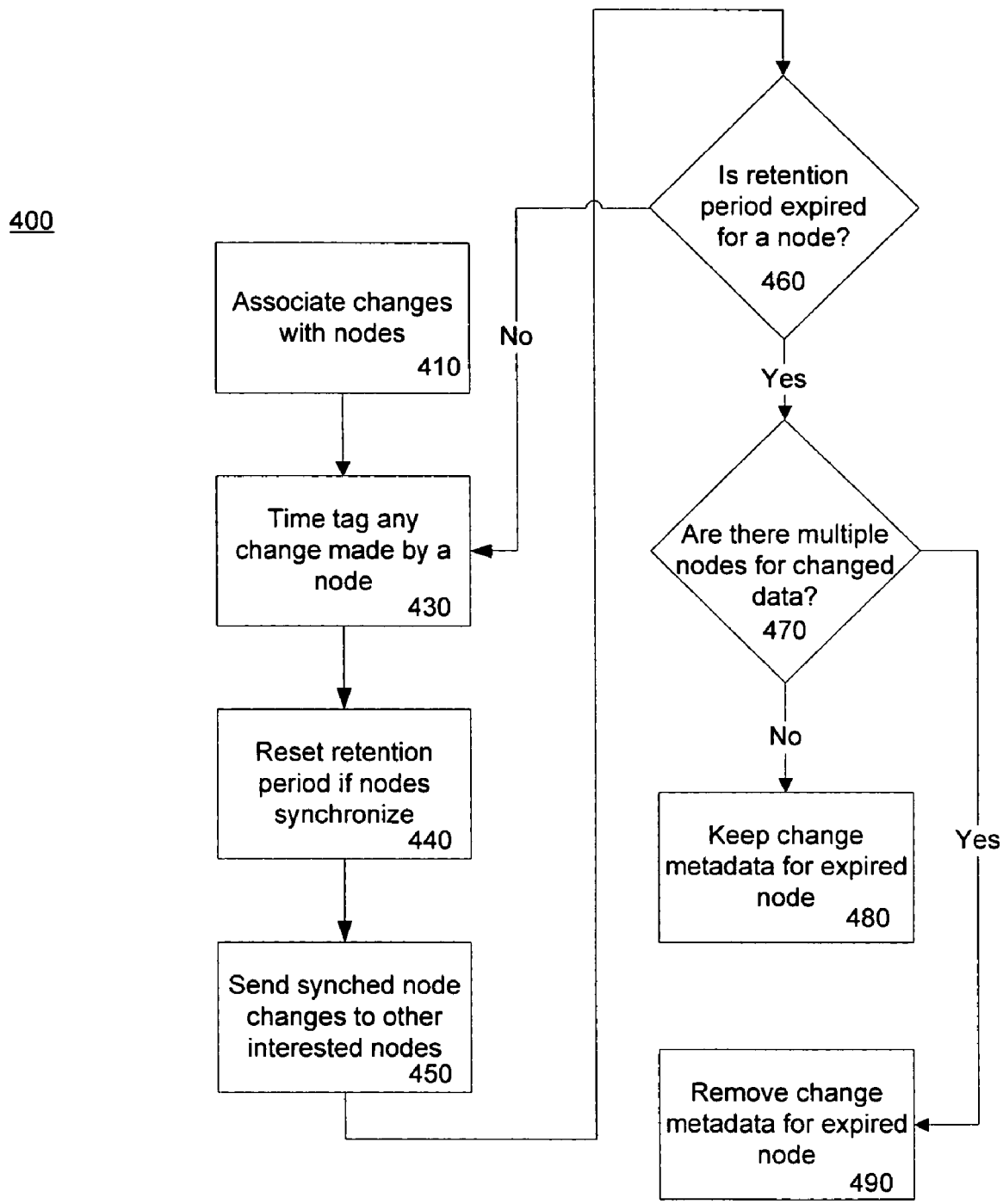
FIG. 4 is a flow diagram of an embodiment of the method of the invention.

FIG. 4 depicts a flow diagram of an exemplary method 400 involving aspects of the invention. In an aspect of the invention, changes made by nodes are tabulated in a change-to node association list (step 410). This association links specific changes to the nodes that produce the changes as well as enables the database to calculate which nodes are to receive updates from any changes made any one node.

The general method 400 may also time tag any change made by a node (step 430) so that the time of the local change is known with respect to the synchronization time or the retention timer value. The general method 400 also resets the retention period timer if nodes synchronize upon submitting changes (step 440). Synchronization involves, at minimum, the entry of data from a node and the conflict resolution of the changed data between all nodes and the database. At node synchronization time, an individual node's metadata retention timer is reset to begin a new retention period count.

As part or as a result of synchronization, changes made by one node concerning specific elements of the database information are propagated to other interested nodes that use the same information (step 450). This step ensures that any change that is made to data that is used by multiple nodes is shared by the other nodes that need the updated information. In one embodiment, the retention expiration period termination for a node is tested (step 460).

If the retention expiration period termination event is not detected (step 460, no path), then the process 400 continues to time tag any data changes made by nodes if they occur (step 430), accommodate synchronizations (step 440), and keep the system updated (step 450). Once a retention period for a node is expired, that is, once the retention timer runs out, this event is detected (step 460, yes path) and a second inquiry is made. The second inquiry involves identifying whether the expired node is a node for which data must be propagated to multiple nodes (step 470).

This inquiry may be answered by scanning the change-to-node association and determining whether the expired node has data that is preferably propagated to other nodes if changes to the data were made. If the answer to step 470 is that the change-to-node association does not indicate that there are other interested nodes, then the conflict resolution metadata for the expired node may be retained and need not be purged (step 480). This has the advantageous result of allowing the expired node to transmit its changes to the database and having the database accept the changes.

However, if the expired node is one where, if changes were made, the changes are preferably propagated to other nodes, then conflict resolution metadata for the expired node is purged (step 490). This result prohibits multiple nodes sharing the same data elements of a database from entering changes to a database beyond the retention period and keeps the accumulation of metadata within reasonable limits.

Exemplary Computing Device

Figure 5:
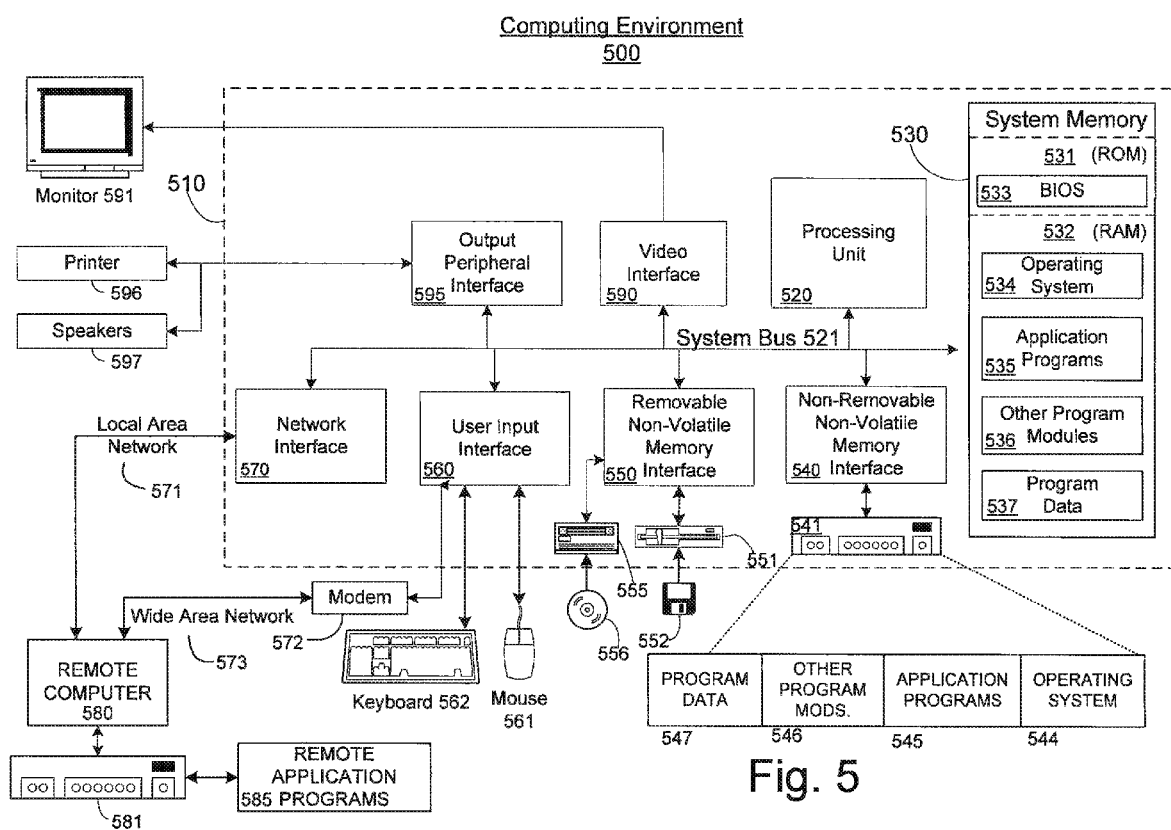
FIG. 5 is a block diagram showing an exemplary computing environment in which aspects of the invention may be implemented.

FIG. 5 and the following discussion are intended to provide a brief general description of a suitable computing environment in which embodiments of the invention may be implemented. While a general purpose computer is described below, this is but one single processor example, and embodiments of the invention with multiple processors may be implemented with other computing devices, such as a client having network/bus interoperability and interaction. Thus, embodiments of the invention may be implemented in an environment of networked hosted services in which very little or minimal client resources are implicated, e.g., a networked environment in which the client device serves merely as an interface to the network/bus, such as an object placed in an appliance, or other computing devices and objects as well. In essence, anywhere that data may be stored or from which data may be retrieved is a desirable, or suitable, environment for operation.

Although not required, embodiments of the invention can also be implemented via an operating system, for use by a developer of services for a device or object, and/or included within application software. Software may be described in the general context of computer-executable instructions, such as program modules, being executed by one or more computers, such as client workstations, servers or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that various embodiments of the invention may be practiced with other computer configurations. Other well known computing systems, environments, and/or configurations that may be suitable for use include, but are not limited to, personal computers (PCs), automated teller machines, server computers, hand-held or laptop devices, multi-processor systems, microprocessor-based systems, programmable consumer electronics, network PCs, appliances, lights, environmental control elements, minicomputers, mainframe computers and the like. Embodiments of the invention may also be practiced in distributed computing environments where tasks are performed by remote processing devices that are linked through a communications network/bus or other data transmission medium. In a distributed computing environment, program modules may be located in both local and remote computer storage media including memory storage devices and client nodes may in turn behave as server nodes.

FIG. 5 thus illustrates an example of a suitable computing system environment 500 in which the embodiments of the invention may be implemented, although as made clear above, the computing system environment 500 is only one example of a suitable computing environment and is not intended to suggest any limitation as to the scope of use or functionality of an embodiment of the invention. Neither should the computing environment 500 be interpreted as having any dependency or requirement relating to any one or combination of components illustrated in the exemplary operating environment 500.

With reference to FIG. 5, an exemplary system for implementing an embodiment of the invention includes a general purpose computing device in the form of a computer system 510. Components of computer system 510 may include, but are not limited to, a processing unit 520, a system memory 530, and a system bus 521 that couples various system components including the system memory to the processing unit 520. The system bus 521 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer system 510 typically includes a variety of computer readable media. Computer readable media can be any available media that can be accessed by computer system 510 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, Random Access Memory (RAM), Read Only Memory (ROM), Electrically Erasable Programmable Read Only Memory (EEPROM), flash memory or other memory technology, Compact Disk Read Only Memory (CDROM), compact disc-rewritable (CDRW), digital versatile disks (DVD) or other optical disk storage, magnetic cassettes, magnetic tape, magnetic disk storage or other magnetic storage devices, or any other medium which can be used to store the desired information and which can accessed by computer system 510. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 530 includes computer storage media in the form of volatile and/or nonvolatile memory such as read only memory (ROM) 531 and random access memory (RAM) 532. A basic input/output system 533 (BIOS), containing the basic routines that help to transfer information between elements within computer system 510, such as during start-up, is typically stored in ROM 531. RAM 532 typically contains data and/or program modules that are immediately accessible to and/or presently being operated on by processing unit 520. By way of example, and not limitation, FIG. 5 illustrates operating system 534, application programs 535, other program modules 536, and program data 537.

The computer system 510 may also include other removable/non-removable, volatile/nonvolatile computer storage media. By way of example only, FIG. 5 illustrates a hard disk drive 541 that reads from or writes to non-removable, nonvolatile magnetic media, a magnetic disk drive 551 that reads from or writes to a removable, nonvolatile magnetic disk 552, and an optical disk drive 555 that reads from or writes to a removable, nonvolatile optical disk 556, such as a CD ROM, CDRW, DVD, or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 541 is typically connected to the system bus 521 through a non-removable memory interface such as interface 540, and magnetic disk drive 551 and optical disk drive 555 are typically connected to the system bus 521 by a removable memory interface, such as interface 550.

The drives and their associated computer storage media discussed above and illustrated in FIG. 5 provide storage of computer readable instructions, data structures, program modules and other data for the computer system 510. In FIG. 5, for example, hard disk drive 541 is illustrated as storing operating system 544, application programs 545, other program modules 546, and program data 547. Note that these components can either be the same as or different from operating system 534, application programs 535, other program modules 536, and program data 537. Operating system 544, application programs 545, other program modules 546, and program data 547 are given different numbers here to illustrate that, at a minimum, they are different copies. A user may enter commands and information into the computer system 510 through input devices such as a keyboard 562 and pointing device 561, commonly referred to as a mouse, trackball or touch pad. Other input devices (not shown) may include a microphone, joystick, game pad, satellite dish, scanner, or the like. These and other input devices are often connected to the processing unit 520 through a user input interface 560 that is coupled to the system bus 521, but may be connected by other interface and bus structures, such as a parallel port, game port or a universal serial bus (USB). A monitor 591 or other type of display device is also connected to the system bus 521 via an interface, such as a video interface 590, which may in turn communicate with video memory (not shown). In addition to monitor 591, computer systems may also include other peripheral output devices such as speakers 597 and printer 596, which may be connected through an output peripheral interface 595.

The computer system 510 may operate in a networked or distributed environment using logical connections to one or more remote computers, such as a remote computer 580. The remote computer 580 may be a personal computer, a server, a router, a network PC, a peer device or other common network node, and typically includes many or all of the elements described above relative to the computer system 510, although only a memory storage device 581 has been illustrated in FIG. 5. The logical connections depicted in FIG. 5 include a local area network (LAN) 571 and a wide area network (WAN) 573, but may also include other networks/buses. Such networking environments are commonplace in homes, offices, enterprise-wide computer networks, intranets and the Internet.

When used in a LAN networking environment, the computer system 510 is connected to the LAN 571 through a network interface or adapter 570. When used in a WAN networking environment, the computer system 510 typically includes a modem 572 or other means for establishing communications over the WAN 573, such as the Internet. The modem 572, which may be internal or external, may be connected to the system bus 521 via the user input interface 560, or other appropriate mechanism. In a networked environment, program modules depicted relative to the computer system 510, or portions thereof, may be stored in the remote memory storage device. By way of example, and not limitation, FIG. 5 illustrates remote application programs 585 as residing on memory device 581. It will be appreciated that the network connections shown are exemplary and other means of establishing a communications link between the computers may be used.

Various distributed computing frameworks have been and are being developed in light of the convergence of personal computing and the Internet. Individuals and business users alike are provided with a seamlessly interoperable and Web-enabled interface for applications and computing devices, making computing activities increasingly Web browser or network-oriented.

For example, MICROSOFT®'s .NET™ platform, available from Microsoft Corporation, includes servers, building-block services, such as Web-based data storage, and downloadable device software. While exemplary embodiments herein are described in connection with software residing on a computing device, one or more portions of an embodiment of the invention may also be implemented via an operating system, application programming interface (API) or a "middle man" object between any of a coprocessor, a display device and a requesting object, such that operation may be performed by, supported in or accessed via all of .NET™'s languages and services, and in other distributed computing frameworks as well.

As mentioned above, while exemplary embodiments of the invention have been described in connection with various computing devices and network architectures, the underlying concepts may be applied to any computing device or system in which it is desirable to implement a metadata cleanup mechanism. Thus, the methods and systems described in connection with embodiments of the present invention may be applied to a variety of applications and devices. While exemplary programming languages, names and examples are chosen herein as representative of various choices, these languages, names and examples are not intended to be limiting. One of ordinary skill in the art will appreciate that there are numerous ways of providing object code that achieves the same, similar or equivalent systems and methods achieved by embodiments of the invention.

The various techniques described herein may be implemented in connection with hardware or software or, where appropriate, with a combination of both. Thus, the methods and apparatus of the invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. One or more programs that may utilize the signal processing services of an embodiment of the present invention, e.g., through the use of a data processing API or the like, are preferably implemented in a high level procedural or object oriented programming language to communicate with a computer. However, the program(s) can be implemented in assembly or machine language, if desired. In any case, the language may be a compiled or interpreted language, and combined with hardware implementations.

While aspects of the present invention has been described in connection with the preferred embodiments of the various figures, it is to be understood that other similar embodiments may be used or modifications and additions may be made to the described embodiment for performing the same function of the present invention without deviating therefrom. Furthermore, it should be emphasized that a variety of computer platforms, including handheld device operating systems and other application specific operating systems are contemplated, especially as the number of wireless networked devices continues to proliferate. Therefore, the claimed invention should not be limited to any single embodiment, but rather should be construed in breadth and scope in accordance with the appended claims.

What is claimed:

1. A method of removing conflict resolution metadata from a distributed database in a multi-node replication system wherein data from the database is replicated out to users at multiple nodes for use and changing thereat, the method comprising:

establishing a conflict resolution metadata retention period for nodes in the system, the conflict resolution metadata retention period upon expiring for a node triggering discarding of conflict resolution metadata concerning conflict resolution for the node from the database, the nodes in the system requesting selected partitions of database data for change before returning changed data back to the database, the conflict resolution metadata concerning the conflict resolution being used to resolve conflicts between the changed data and the database data before the changed data is stored into the database;

associating data changes with nodes, a change to a portion of database data made by the node being mapped to other interested nodes, such that the node and the other interested nodes can receive updated changes to the portion of database data;

removing conflict resolution metadata corresponding to the node if a conflict resolution metadata retention period for the node has expired and other interested nodes are included in the association of data changes; and maintaining conflict resolution metadata corresponding to the node if the conflict resolution metadata retention period for the node has expired and no other interested nodes are included in the association of data changes, the conflict resolution metadata for each change to a partition element comprising a node making the change, a time of the change, a type of change, other nodes affected by the change, and before and after values associated with the change, the conflict resolution metadata for each node being maintained thereby at the node and including: a first list indicating for each change those other nodes to which the change needs to be distributed; a second list indicating information about each change including metadata about the change and a time the change was made; and a third list indicating for each other node a last time the other node received all changes from the node, conflict resolution metadata for a particular change being removable if all nodes that need the particular change, according to the first list, have already received the particular change, according to the second and third lists.

2. The method of claim 1, wherein associating data changes with nodes further comprises generating a change-to-node mapping.

3. The method of claim 1, further comprising time tagging a generation of each change to database data made by a node.

4. A system for replicating data which includes conflict resolution metadata management, the system comprising:

a distributed database having distribution nodes, data from the database being replicated out to users at the distribution nodes for use and changing thereat, the nodes requesting selected partitions of database data for change before returning changed data back to the database, conflict resolution metadata concerning conflict resolution being used to resolve conflicts between the changed data and the database data before the changed data is stored into the database, means for executing instructions, the instructions performing a method comprising:

establishing a conflict resolution metadata retention period for nodes in the system, the conflict resolution metadata retention period upon expiring for a node triggering discarding of conflict resolution metadata concerning conflict resolution for the node;

associating data changes with nodes, a change to a portion of database data made by the node being mapped to other interested nodes, such that the node and the other interested nodes can receive updated changes to the portion of database data by generating a change-to-node mapping;

removing conflict resolution metadata corresponding to the node if a conflict resolution metadata retention period for the node has expired and other interested nodes are included in the association of data changes; and maintaining conflict resolution metadata corresponding to the node if the conflict resolution metadata retention period for the node has expired and no other interested nodes are included in the association of data changes, the conflict resolution metadata for each change to a partition element comprising a node making the change, a time of the change, a type of change, other nodes affected by the change, and before and after values associated with the change, the conflict resolution metadata for each node being maintained thereby at the node and including: a first list indicating for each change those other nodes to which the change needs to be distributed; a second list indicating information about each change including metadata about the change and a time the change was made; and a third list indicating for each other node a last time the other node received all changes from the node, conflict resolution metadata for a particular change being removable if all nodes that need the particular change, according to the first list, have already received the particular change, according to the second and third lists.

5. A computer-readable storage medium having computer-executable instructions for performing a method for removing conflict resolution metadata from a distributed database in a multi-node replication system wherein data from the database is replicated out to users at multiple nodes for use and changing thereat, the method comprising:

establishing a conflict resolution metadata retention period for nodes in the system, the conflict resolution metadata retention period upon expiring for a node triggering discarding of conflict resolution metadata concerning conflict resolution for the node from the database, the nodes in the system requesting selected partitions of database data for change before returning changed data back to the database, the conflict resolution metadata concerning the conflict resolution being used to resolve conflicts between the changed data and the database data before the changed data is stored into the database;

associating data changes with nodes, a change to a portion of database data made by the node being mapped to other interested nodes, such that the node and the other interested nodes can receive updated changes to the portion of database data;

removing conflict resolution metadata corresponding to the node if a conflict resolution metadata retention period for the node has expired and other interested nodes are included in the association of data changes; and maintaining conflict resolution metadata corresponding to the node if the conflict resolution metadata retention period for the node has expired and no other interested nodes are included in the association of data changes, the conflict resolution metadata for each change to a partition element comprising a node making the change, a time of the change, a type of change, other nodes affected by the change, and before and after values associated with the change, the conflict resolution metadata for each node being maintained thereby at the node and including: a first list indicating for each change those other nodes to which the change needs to be distributed; a second list indicating information about each change including metadata about the change and a time the change was made; and a third list indicating for each other node a last time the other node received all changes from the node, conflict resolution metadata for a particular change being removable if all nodes that need the particular change, according to the first list, have already received the particular change, according to the second and third lists.

* * * * *